United States Patent
Wein et al.

(10) Patent No.: US 11,351,971 B2
(45) Date of Patent: *Jun. 7, 2022

(54) METHOD FOR ESTIMATING THE COEFFICIENT OF FRICTION OF A HYDRAULIC BRAKE SYSTEM

(71) Applicant: AUDI AG, Ingolstadt (DE)

(72) Inventors: Michael Wein, Seubersdorf (DE); Matthias Geuß, Breitengüßbach (DE)

(73) Assignee: AUDI AG, Ingolstadt (DE)

( * ) Notice: Subject to any disclaimer, the term of this patent is extended or adjusted under 35 U.S.C. 154(b) by 444 days.

This patent is subject to a terminal disclaimer.

(21) Appl. No.: 16/341,503

(22) PCT Filed: Oct. 17, 2017

(86) PCT No.: PCT/EP2017/076408
§ 371 (c)(1),
(2) Date: Apr. 12, 2019

(87) PCT Pub. No.: WO2018/073206
PCT Pub. Date: Apr. 26, 2018

(65) Prior Publication Data
US 2019/0299954 A1    Oct. 3, 2019

(30) Foreign Application Priority Data
Oct. 18, 2016    (DE) ............ 10 2016 220 415.7

(51) Int. Cl.
B60T 13/66    (2006.01)
B60T 8/172    (2006.01)
B60W 40/068    (2012.01)

(52) U.S. Cl.
CPC ............ *B60T 13/662* (2013.01); *B60T 8/172* (2013.01); *B60W 40/068* (2013.01)

(58) Field of Classification Search
CPC .............................. B60T 13/662; B60T 8/172
See application file for complete search history.

(56) References Cited

U.S. PATENT DOCUMENTS 9,586,569 B2    3/2017    Drewes
10,328,920 B2    6/2019    Kistner et al.

FOREIGN PATENT DOCUMENTS

| CN | 104349959 A | | 2/2015 | |
|---|---|---|---|---|
| CN | 105189227 A | | 12/2015 | |
| CN | 107848508 | * | 6/2020 | ............ F16D 65/18 |
| DE | 35 02 050 A1 | | 7/1986 | |
| DE | 19805091 | * | 8/1999 | ............ B60T 8/172 |

(Continued)

OTHER PUBLICATIONS

International Search Report and Written Opinion of the International Searching Authority dated Jan. 23, 2018 in corresponding International application No. PCT/EP2017/076408; 28 pages.

(Continued)

*Primary Examiner* — Ig T An
(74) *Attorney, Agent, or Firm* — Maier & Maier, PLLC

(57) ABSTRACT

A system and a method for estimating the coefficient of friction of a hydraulic brake system in a motor vehicle. A system and a method for adjusting the braking torque of a hydraulic brake system in a motor vehicle in order to obtain a desired actual braking torque.

4 Claims, 2 Drawing Sheets

(56) References Cited

FOREIGN PATENT DOCUMENTS

| DE | 10 01 1270 A1 | | 9/2001 | |
|----|---|---|---|---|
| DE | 10 2010 043 320 A1 | | 5/2012 | |
| DE | 10 2014 226 290 A1 | | 6/2016 | |
| EP | 0 894 685 A2 | | 2/1999 | |
| GB | 2 435 102 A | | 8/2007 | |
| JP | H1143041 A | | 2/1999 | |
| JP | 2009168239 A | | 7/2009 | |
| WO | WO-2009106455 | * | 9/2009 | ............. B60T 8/172 |
| WO | WO-2013087481 | * | 6/2013 | ............. B60T 8/172 |

OTHER PUBLICATIONS

English translation of international preliminary report on patentability dated May 2, 2019 in corresponding International Application No. PCT/EP2017/076408; 9 pages.

Office Action dated Oct. 27, 2020 in corresponding Chinese Application No. 201780064146.4; 15 pages including English-language translation.

* cited by examiner

METHOD FOR ESTIMATING THE COEFFICIENT OF FRICTION OF A HYDRAULIC BRAKE SYSTEM

FIELD

The disclosure relates to a system and a method for estimating the coefficient of friction of a hydraulic brake system of a motor vehicle. In addition, the disclosure relates to a system and a method for adjusting the set braking torque of a hydraulic brake system of a motor vehicle to obtain a desired actual braking torque.

BACKGROUND

The coefficient of friction (also known as the Cp value) of a hydraulic brake system between the brake pad and brake disc determines the braking torque produced and is proportional to the brake pressure. Since only the brake pressure can be measured, it is important for accurate knowledge of the braking torque on the wheels to estimate the coefficient of friction as accurately as possible. By measuring the vehicle deceleration and the brake pressure and with knowledge of the automotive parameters, for example, the weight of the vehicle, it is possible to calculate the coefficient of friction. There is also a method for estimating the coefficient of friction, which does not require knowledge of the weight of the vehicle and in which the longitudinal deceleration due to the friction brake is compared with that due to an electric motor whose torque is known precisely.

DE 35 02 050 A1 proposes measuring the temperature resulting in the brake system that produces the braking torque as a characteristic value for the braking torque and to analyze this result in an analytical unit.

DE 100 11 270 A1 discloses a method and an apparatus for determining a characteristic value of a wheel brake, which represents the relationship between the brake pressure and the braking torque. The brake characteristic value is determined for each individual wheel by calculation of wheel-specific variables such as wheel slip, wheel contact force, wheel braking pressure and wheel radius for each individual wheel.

DE 10 2014 226 290 discloses a method for adjusting or controlling a brake actuation variable BR(FZ), which refers either to the tension force F or the braking pressure PR or the tension distance X (xs) of a vehicle brake having at least one braked wheel R in an electrohydraulic or electromechanical vehicle brake, which is mounted on the chassis of a vehicle by a brake mount and brakes the wheel by means of friction linings in accordance with the brake actuation variable BR(FZ), wherein the wheel circumferential force F(FU) resulting from the contact of the braked wheel with the road surface is measured, and an influence on braking force F(FU) is implemented as a function of the increase in the wheel circumferential force F($\Delta$FU/$\Delta$s), such that the actual value of regulation is the increase in the wheel circumferential force F($\Delta$FU/$\Delta$s), which is regulated by adjusting the brake actuating variable BR(FZ) at a predetermined set value TVR(OP($\Delta$FU/$\Delta$s)) or a set range TUR(OP($\Delta$FU/$\Delta$s)) $\pm$R($\Delta$FU/$\Delta$s)).

DE 10 2010 043 320 A1 discloses a device and a method for determining a measure for a frictional force acting on a disc brake of a motor vehicle. A sensor device arranged on the disc measures the displacement in the brake mount caused by the action of the braking force in a direction perpendicular to the axial direction of the brake disc. The measure of the acting braking torque is determined on the basis of the deformation in the brake mount caused by the frictional force in a direction tangential to the surface of the brake disc.

SUMMARY

Against this background, there was the object of making available a novel system and a method for estimating the coefficient of friction of a hydraulic brake system of a motor vehicle, which will not require the use of automotive parameters, for example, the weight of the vehicle.

Within the scope of the present invention, is a novel system for estimating a coefficient of friction of a hydraulic system of a motor vehicle. Embodiments are derived from the description. In addition, a method for estimating a coefficient of friction of a hydraulic brake system of a motor vehicle is presented. Embodiments are derived from the description.

In addition, a method for adjusting a set braking torque of a hydraulic brake system of a motor vehicle to obtain the desired actual braking torque is presented, and a system suitable for doing so is also presented. Embodiments are derived from the description and drawings.

BRIEF DESCRIPTION OF THE FIGURES

The invention is illustrated schematically on the basis of embodiments in the drawings and is described schematically and in detail with reference to the drawings, in which.

DETAILED DESCRIPTION

The invention provides a solution for estimation of the coefficient of friction of a hydraulic brake system of a motor vehicle, which does not require the use of automotive parameters such as the weight of the vehicle. Within the scope of the invention, control systems and measurement systems which are usually present in a vehicle are used. Additional advantages and embodiments of the invention are derived from the following description.

The system according to the invention comprises at least one hydraulic brake system, which acts on a wheel or an axle of the motor vehicle, and at least one additional actuator system, which can apply a braking torque to the wheel and/or the axle with a higher precision than the hydraulic brake system. Furthermore, the system according to the invention comprises at least one sensor and one unit for calculating an estimated coefficient of friction from the sensor data.

In one embodiment, the additional actuator system comprises at least one direct drive motor. In another embodiment the additional actuator system comprises at least one single-wheel electric motor.

Figure 1:
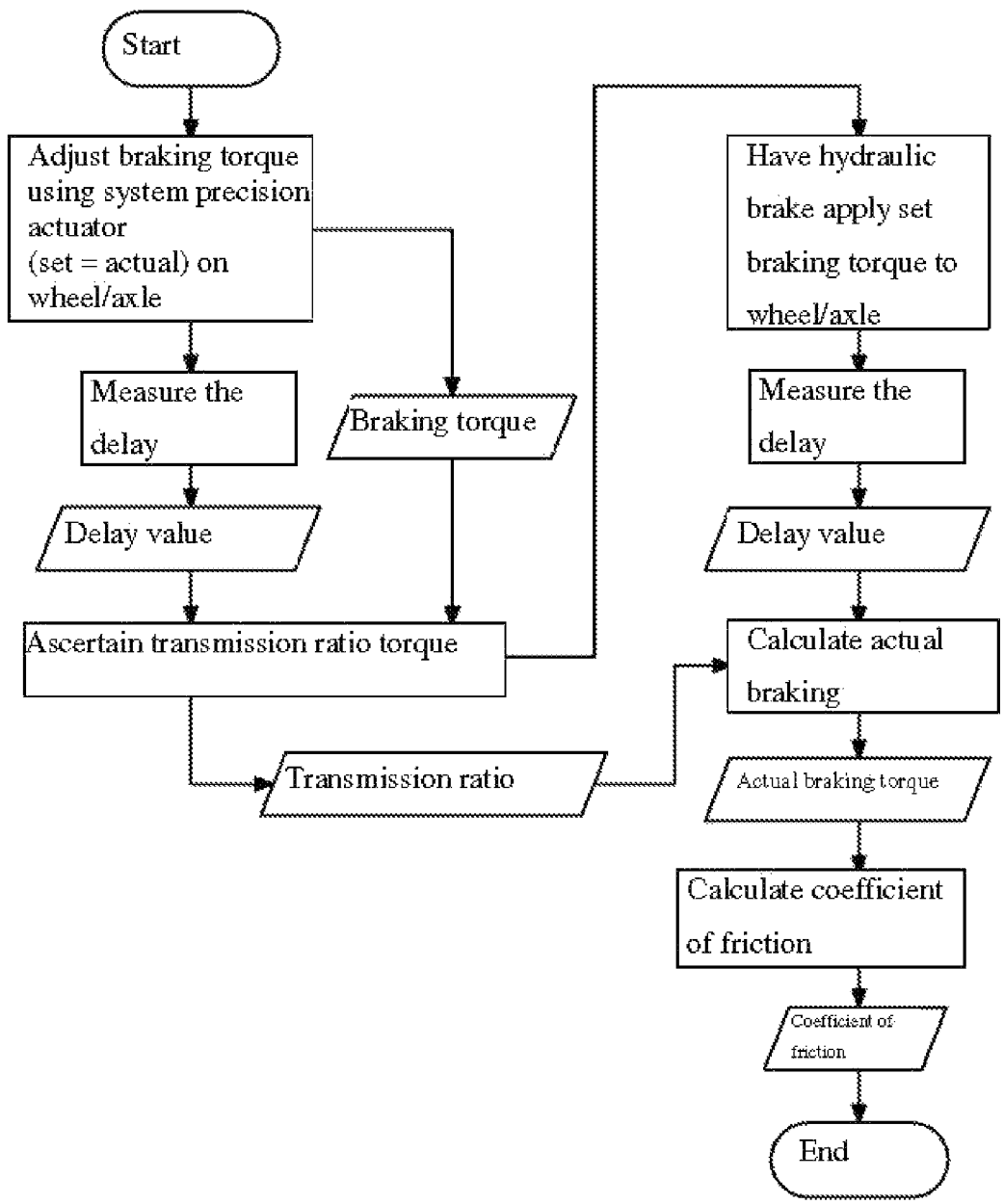
FIG. 1 shows a flow chart of the method according to the invention for estimating the coefficient of friction of a hydraulic brake system of a motor vehicle in which the method steps and data flows are illustrated.

The system according to the invention includes at least one suitable sensor. In one embodiment, the system includes at least one wheel rpm sensor. In another embodiment, the system comprises at least one wheel speed sensor. In another embodiment, the system comprises at least one brake pressure sensor. The method according to the invention for estimating the coefficient of friction of a hydraulic brake system of a motor vehicle comprises the following steps: a braking torque (set=actual) is set on the wheel and/or axle by means of an actuator system having a high control precision; the wheel deceleration induced by the braking torque and the transmission ratio between the braking torque and the wheel deceleration are determined. A set braking torque is applied to the wheel and/or axle by means of the hydraulic brake system, and the wheel deceleration is measured. It is possible in this way to calculate the actual braking torque and thus the actual coefficient of friction of the hydraulic brake system using the inverse transmission ratio between the braking torque and the wheel deceleration. If the wheel brakes are connected to an axle, e.g., hydraulically, then the braking torque on the wheel corresponds to half of the braking torque on the axle. If the axles are connected via the brake system, for example, via the hydraulically installed distribution, then the braking torque on the corresponding axle can be calculated with this distribution and the total braking torque. For the sake of illustration, the sequence of the method according to the invention is also illustrated as a flow charge in FIG. 1 showing the individual method steps and the data flows.

Due to the unknown coefficient of friction of the brake system, the set braking torque usually differs from the actual braking torque. Additional actuator systems (e.g., single-wheel electric motors, direct drive electric motor) are known which can apply a braking torque with a greater control precision than the brake system. The set braking torque thus shows a good correspondence to the actual braking torque. A braking torque is set on the wheel and/or axle (set braking torque=actual braking torque) by means of an actuator system having a high control precision, and the wheel deceleration is measured, and the transmission ratio between the braking torque and the wheel deceleration is determined. A set braking torque is applied by means of the hydraulic brake system, and the wheel deceleration is measured, and the actual torque of the friction brake on the wheel and/or axle is concluded with the inverse transmission ratio between the braking torque and the wheel deceleration. With knowledge of the set torque and a nominal coefficient of friction, it is possible to infer the actual coefficient of friction:

Actual coefficient of friction=actual braking torque/ set braking torque*nominal coefficient of friction Alternatively, the actual coefficient of friction can be calculated as follows via measurement of the brake pressure:

Actual coefficient of friction=actual braking torque/ brake pressure.

Another object achieved within the scope of the present invention consists of setting a desired actual braking torque with a hydraulic brake system on a wheel and/or an axle. In this case, one is interested not in the coefficient of friction but instead in the ratio between the set and actual braking torques of the hydraulic brake system. The set braking torque of the hydraulic brake system can be multiplied times this factor in order to arrive at the desired braking torque on the wheel. To do so, the actual braking torque of the brake system on the wheel and/or the axle is determined as described above and is related it to the set braking torque of the brake system on the wheel and/or axle.

Figure 2:
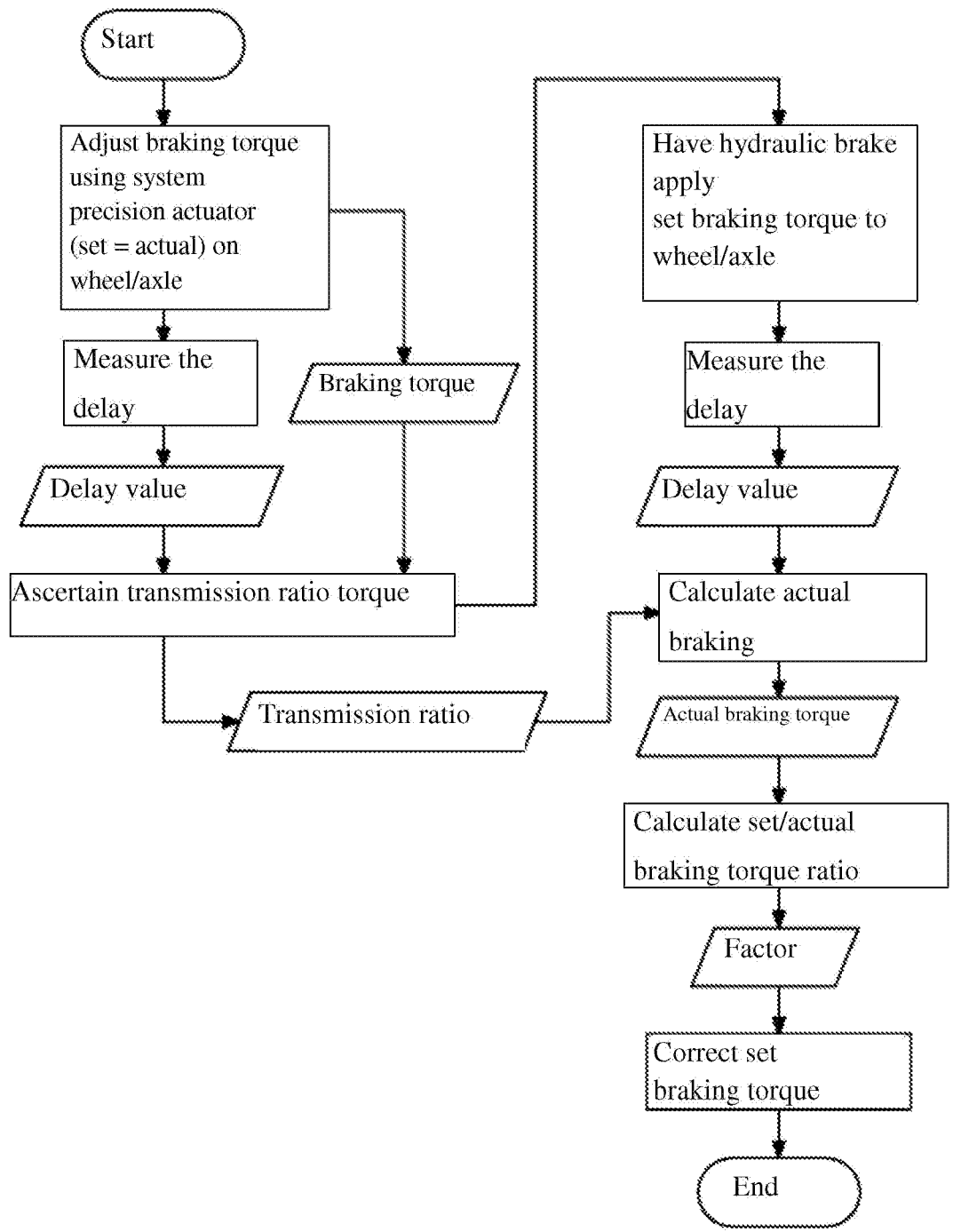
FIG. 2 shows a flow chart of the method according to the invention for adjusting the set braking torque of a hydraulic brake system of a motor vehicle to obtain a desired actual braking torque in which the methods steps and data flows are illustrated.

Therefore, the subject matter of the invention is also a system and a method for adjusting the set braking torque of a hydraulic brake system of a motor vehicle to achieve a desired actual braking torque. The desired actual braking torque corresponds to the original set braking torque. The method comprises adjusting a braking torque on a wheel or an axle of the motor vehicle by means of an actuator system, which has a higher control precision than the hydraulic brake system and measurement of the deceleration of the wheel or axle induced by the braking torque with a subsequent determination of the transmission ratio between the braking torque and the deceleration of the wheel or the axle. In addition, the method consists of applying a set braking torque to the wheel or the axle of the motor vehicle via the hydraulic brake system, measuring the deceleration of the wheel or the axle induced by the braking torque and estimating the actual braking torque based on the inverse of the transmission ratio between the braking torque and the deceleration of the wheel or the axle. Then the ratio between the set braking torque and the actual braking torque of the hydraulic brake system is calculated, and the set braking torque of the hydraulic brake system is multiplied times the resulting factor to obtain a set braking torque which creates an actual braking torque which corresponds to the original set braking torque. For the sake of illustration, the sequence of the method according to the invention is also represented as a flow chart in FIG. 2, which shows the individual method steps and data flows.

In addition, the invention provides a system for adjusting the set braking torque of a hydraulic brake system of a motor vehicle in order to obtain a desired actual braking torque. The desired actual braking torque here corresponds to the original set braking torque. The system comprises at least one hydraulic brake system, which acts on a wheel or an axle of the motor vehicle, and at least one additional actuator system, which can apply a braking torque to the wheel and/or the axle with a higher control precision than the hydraulic brake system. The system also comprises at least one sensor, a unit for calculating an actual braking torque from the sensor data and a unit for altering the set braking torque of the hydraulic brake system.

Examples of other suitable actuator systems include direct drive motors and Single-wheel electric motors. Suitable sensors include, for example, wheel rpm sensors, wheel speed sensors or brake pressure sensors.

It is self-evident that the features mentioned above can be used not only in the combination given but also in other combinations or alone without going beyond the scope of the present invention.

The invention claimed is:

1. A method for estimating a coefficient of friction of a hydraulic brake system for a motor vehicle, comprising the steps:
 a) setting a braking torque on a wheel or an axle of the motor vehicle by an actuator system, which has a higher control precision than the hydraulic brake system;
 b) measuring a first deceleration of the wheel or axle induced by the set braking torque;
 c) determining a transfer ratio between the set braking torque and the first deceleration of the wheel or axle;
 d) applying the set braking torque to the wheel or axle of the motor vehicle via the hydraulic brake system;
 e) measuring a second deceleration of the wheel or axle induced by the set braking torque;
 f) estimating an actual braking torque on the basis of an inverse of the transfer ratio; and
 g) calculating the coefficient of friction of the hydraulic brake system based on the estimated actual braking torque.

2. The method according to claim 1, in which the coefficient of friction ($C_p$) is calculated from the set braking torque ($\tau_{set}$), the actual braking torque ($\tau_{actual}$), and a nominal coefficient of friction ($C_{p_{nominal}}$) of the hydraulic brake system according to the following equation:

$$C_p = \frac{\tau_{actual}}{\tau_{set}} \times C_{p_{nominal}}.$$

3. The method according to claim 1, in which the coefficient of friction ($C_p$) is calculated based on a proportionality factor between the actual braking torque ($\tau_{actual}$) and a brake pressure ($p_{brake}$) of the hydraulic brake system.

4. A method for adjusting a set braking torque of a hydraulic brake system of a motor vehicle to achieve a desired actual braking torque, comprising the steps:
  a) setting a first set braking torque on a wheel or axle of the motor vehicle via an actuator system having a higher control precision than the hydraulic brake system;
  b) measuring a first deceleration of the wheel or axle induced by the first set braking torque;
  c) determining a first transfer ratio between the first set braking torque and the first deceleration of the wheel or axle;
  d) applying the first set braking torque to the wheel or axle of the motor vehicle via the hydraulic brake system;
  e) measuring a second deceleration of the wheel or axle induced by the first set braking torque;
  f) estimating an actual braking torque via an inverse of the first transfer ratio;
  g) calculating a second transfer ratio between the first set braking torque and the actual braking torque of the hydraulic brake system; and
  h) multiplying the first set braking torque of the hydraulic brake system by a resulting factor to obtain a second set braking torque that corresponds to the desired actual braking torque.

* * * * *